May 1, 1923.
H. M. ROCKWELL
METHOD OF MANUFACTURE OF ANTIFRICTION BEARINGS
Filed April 10, 1920
1,453,366
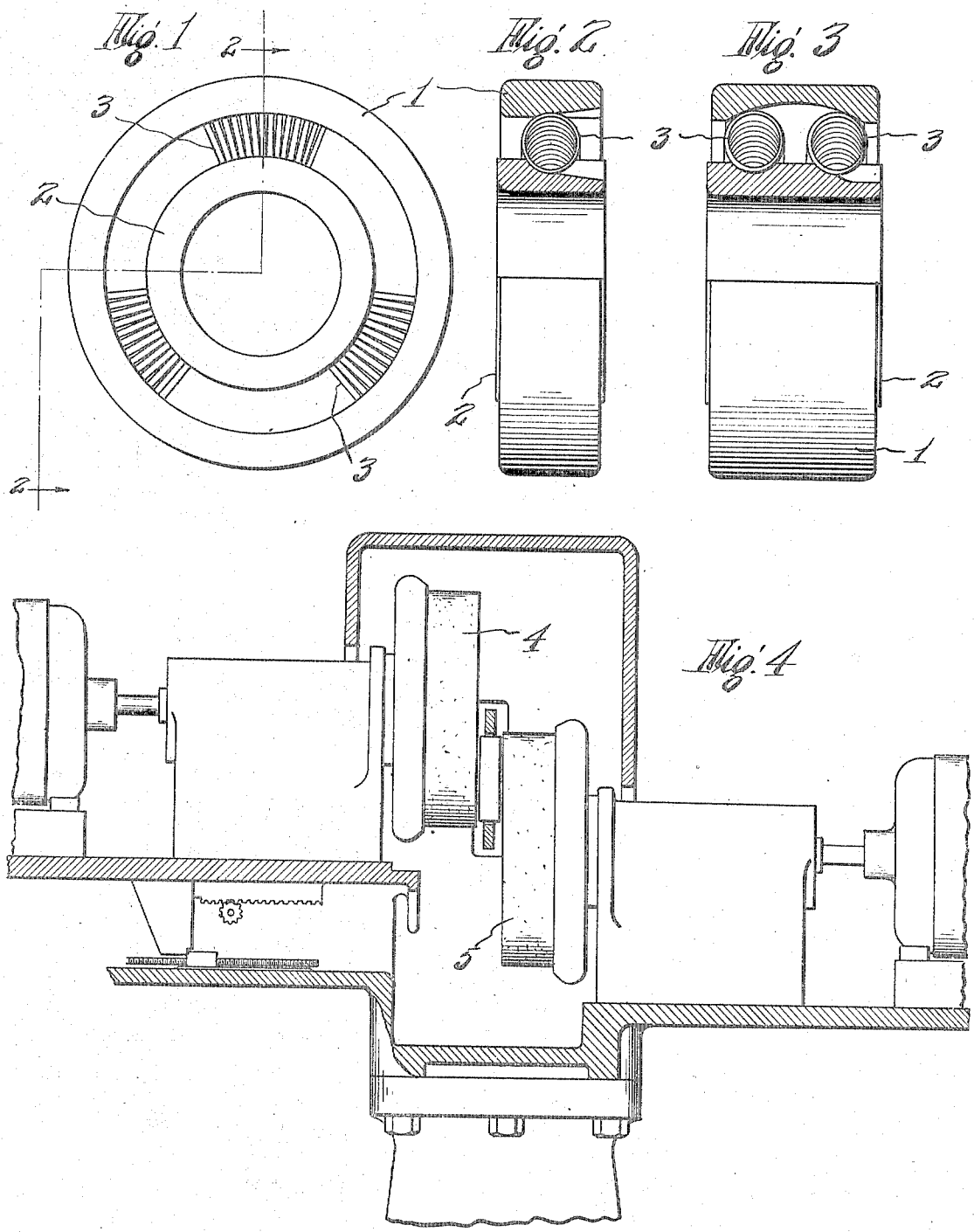
INVENTOR
HUGH M. ROCKWELL
BY
Edward C. Sasnett
ATTORNEY Patented May 1, 1923.

1,453,366

UNITED STATES PATENT OFFICE.

HUGH M. ROCKWELL, OF BRISTOL, CONNECTICUT, ASSIGNOR, BY MESNE ASSIGNMENTS, TO STANDARD STEEL AND BEARINGS INCORPORATED, OF WILMINGTON, DELAWARE, A CORPORATION OF DELAWARE.

METHOD OF MANUFACTURE OF ANTIFRICTION BEARINGS.

Application filed April 10, 1920. Serial No. 372,898.

*To all whom it may concern:*

Be it known that I, HUGH M. ROCKWELL, a citizen of the United States, and a resident of Bristol, in the county of Hartford and State of Connecticut, have invented certain new and useful Improvements in Methods of Manufacture of Antifriction Bearings, of which the following is a specification.

This invention relates to the manufacture of anti-friction bearings and more especially to the manufacture of that type of bearing known to the trade as "unit-handling." It is highly desirable in bearings of the unit-handling type that the opposite faces of the bearing be parallel and that the corresponding faces of the race members be in alinement. The method followed by manufacturers of antifriction bearings of separately grinding the faces of each race member until the desired width of the race member has been obtained does not insure alinement of the corresponding faces of the race members when assembled into a bearing, since the ball raceways may not be disposed exactly symmetrically with reference to the faces of the race members.

In my copending application, Serial No. 341,772, filed December 1, 1919, I have disclosed a method for obtaining the desired alinement of the corresponding faces of the race members, which consists in first completing all the operations upon the race members with the exception of grinding the faces of said members and then assembling the race members with antifriction elements and spacers to form a bearing, after which the bearing is introduced between the opposed parallel faces of grinding wheels to simultaneously treat all the faces of the race members. According to this method, ball bearings are produced with their opposite faces parallel and the corresponding faces of the race members in alinement. Under the influence of the grinding wheels, however, the inner race member rotates relative to the outer race member and impedes somewhat the grinding operation. Furthermore, dirt, dust, and grinding fluid becomes lodged in the space between the raceways and around the balls, which fact requires that the bearings be thoroughly washed before being packed.

The object of this invention is the provision of a method of manufacture of antifriction bearings or the like whereby the alinement of the corresponding faces of the race members is assured.

A further object of this invention is the provision of means, by the use of which the race members of a bearing may be arranged in their assembled relation and be prevented from rotary movement relative to each other.

An additional object of the invention is the provision of a method by means of which the faces of both race members of an antifriction bearing may be ground simultaneously.

According to my improved method, an inner and outer race member, which are to be later assembled with antifriction elements to form a bearing, are arranged in their assembled relation, and while in such assembled relation the corresponding faces of the race members are simultaneously ground.

To maintain the race members in their assembled relation, I prefer to make use of a series of resilient members interposed between the race members, the resilient members being of such dimensions that when interposed between the raceways they are under compression. These resilient members are preferably tightly-wound, spring-wire helices of a diameter slightly in excess of the distance between the raceways and of a length somewhat in excess of their diameter. The resilient members are so designed as to have sufficient strength to prevent relative displacement of the race members.

In order that each face of each race member may be subjected to the grinding operation without reducing the width of the completed bearing below the standard width, it is preferable to make the blanks from which the race members of one set are to be made of slightly greater width than the blanks for the other set. When these race members are brought into their assembled relation by means of the resilient spacing elements, the faces of one race member will project slightly beyond the corresponding faces of the other race member. The race members are now introduced between the opposed parallel faces of two grinding wheels, preferably offset from each other, and which are preferably rotated in such directions as to cause the opposed portions of the wheels to travel in opposite directions, and are loosely held between said wheels. One of the wheels is fed toward the other until the width of the race members is reduced to that desired. As the corresponding faces of a race member are simultaneously ground while in their assembled relation, the alinement of such faces is procured. Although the blank for either set of race members may be of greater width, it has been found desirable that the inner race member be the one of greater width.

In the drawings,

Fig. 1 is a side elevation of the race members of a single-row bearing in position to be ground;

Fig. 2 is a section partly in elevation on line 2—2 of Fig. 1;

Fig. 3 is a similar section of a double-row bearing;

Fig. 4 is a diagrammatic view of the grinding operation.

The outer race member is denoted by the reference character 1 and the inner race member by the character 2, the race members being maintained in their assembled relation or concentric position by means of the spring-wire, closely-wound helices 3. These helices may be introduced between the race members by arranging the race members eccentric with respect to each other, inserting preferably three helices between the race members in the space thus provided, and then positioning them at regular intervals. These helices are of such diameter that when introduced between the race members and separated from each other, they will be under compression and are of a length slightly exceeding the diameter of the antifriction elements to be used in connection with the race members.

The outer race member 1 is preferably of a width very slightly in excess of that of a finished bearing, while the race member 2 exceeds in width the member 1 by an amount sufficient to insure the projection of each face thereof beyond the corresponding face of the race member 1, even though the raceways of each member are not exactly symmetrically disposed with respect to the faces of said member. The unit disclosed in either Fig. 2 or Fig. 3 is then introduced between the grinding wheels 4 and 5 of the general type disclosed in Fig. 4 and is loosely held therebetween by means of a suitable holder 6. The wheels 4 and 5 are caused to rotate in such a manner that the opposed surfaces thereof travel in opposite directions. The difference in the linear speed of the wheels acting on different portions of the interposed unit causes a rotation thereof whereby all points on the faces thereof are uniformly treated.

Because of the fact that the spacing elements 3 are under compression when arranged in spaced relation between the race members, they grip the race members and prevent the rotation thereof relative to each other. The race members are thus caused to rotate as a unit and makes more effective the action of the grinding wheels.

The first action of the wheels is to reduce the width of the member 1, after which the wheels act upon the surfaces of both members. Thus the corresponding surfaces of both members are ground into alinement.

After the grinding operation has been completed the race members are removed from between the grinding wheels. The spacing elements 3 are then grouped together, allowing the eccentric displacement of the race members, after which the elements are removed. Any foreign matter that may have gotten on the race members during the grinding operation is now removed, this being quite easy since each race member can be taken care of individually.

A machine particularly well adapted for the grinding of these elements is disclosed in my copending application, Serial No. 141,608, filed January 10, 1917.

What I claim is:

1. The steps in the manufacture of antifriction bearings which consist in assembling the race members in normal relation and in arranging the race members thereof in assembled relation by the insertion between said race members of resilient spacing members and simultaneously grinding the opposite faces of the race members.

2. The steps in the manufacture of antifriction bearings which consist in positioning the race members thereof in assembled relation by the insertion between said race members of spacing members arranged to prevent relative rotation of said race members and simultaneously grinding the opposite faces of the race members.

3. The steps in the manufacture of antifriction bearings which consist in positioning spring-wire helices between the race members thereof and then simultaneously grinding the faces of said race members.

4. The steps in the manufacture of antifriction bearings which consist in positioning spacing members between the race members and then simultaneously grinding the faces of said race members.

5. The steps in the manufacture of antifriction bearings which consist in arranging the race members thereof in assembled relation by the insertion between said race members of non-rotatable spacing members and simultaneously grinding the opposite faces of said race members.

HUGH M. ROCKWELL.